United States Patent Office

Des. 227,494
Patented June 26, 1973

227,494

CHILD'S RIDING VEHICLE

Laurie J. Campbell and Robert T. Auer, Erie, Pa., assignors to Louis Marx & Co., Inc. (Delaware), New York, N.Y.

Filed Mar. 13, 1972, Ser. No. 234,445

Term of patent 14 years

Int. Cl. D21—01

U.S. Cl. D34—15 AJ

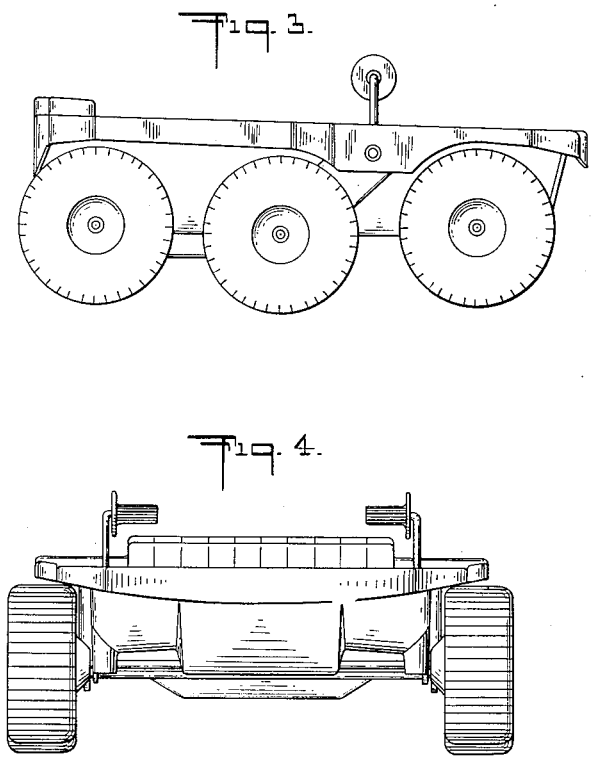

Figure 1:
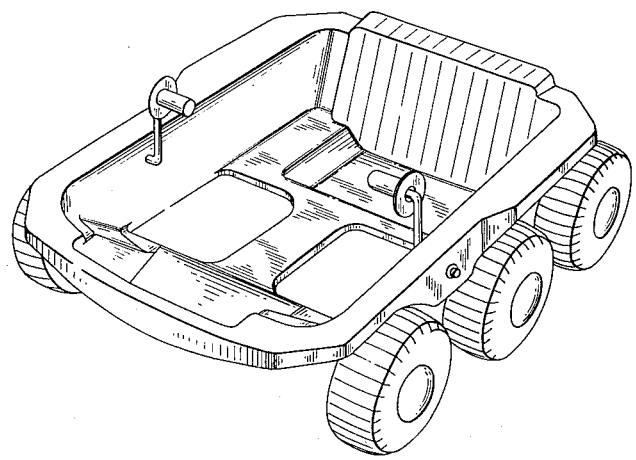
Figure 2:
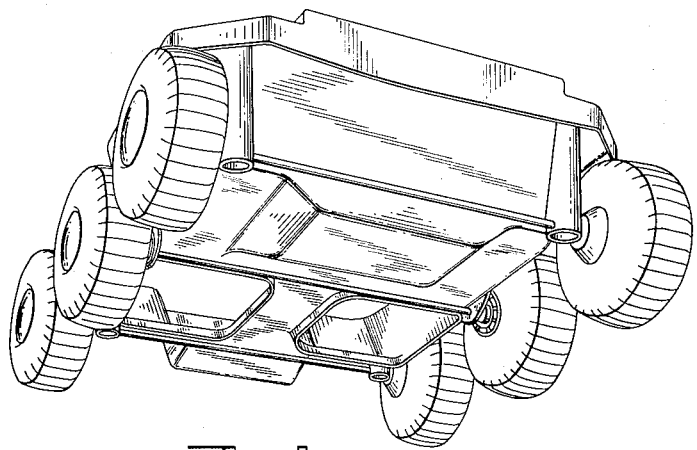

FIG. 1 is a top, front and left side perspective view of a child's riding vehicle showing our new design;
FIG. 2 is a bottom and rear perspective view thereof;
FIG. 3 is a right side elevational view thereof;
FIG. 4 is a front elevational view thereof.

We claim:
The ornamental design for a child's riding vehicle, as shown.

References Cited
UNITED STATES PATENTS

D. 220,508   4/1971   Good _____ D34—15 AJ
D. 220,323   3/1971   Nobbs _____ D14—3 G OTHER REFERENCES
Toys, March 1971, p. 169, item No. 18 at top right.

JOEL STEARMAN, Primary Examiner
N. C. HOLTJE, Assistant Examiner